US010584619B2

(12) United States Patent
Ruf et al.

(10) Patent No.: US 10,584,619 B2
(45) Date of Patent: Mar. 10, 2020

(54) VARIABLE VALVE GEAR

(71) Applicant: MAN Truck & Bus AG, München (DE)

(72) Inventors: Sibylle Ruf, Pyrbaum (DE); Adrian Fink, Nuremberg (DE)

(73) Assignee: MAN Truck & Bus AG, München (DE)

( * ) Notice: Subject to any disclaimer, the term of this patent is extended or adjusted under 35 U.S.C. 154(b) by 4 days.

(21) Appl. No.: 15/945,485

(22) Filed: Apr. 4, 2018

(65) Prior Publication Data

US 2018/0291776 A1    Oct. 11, 2018

(30) Foreign Application Priority Data

Apr. 8, 2017    (DE) .................... 10 2017 003 439

(51) Int. Cl.
*F01L 13/00*    (2006.01)
*F01L 1/18*    (2006.01)
(Continued)

(52) U.S. Cl.
CPC ........... *F01L 13/0036* (2013.01); *F01L 1/047* (2013.01); *F01L 1/18* (2013.01); *F01L 1/181* (2013.01);
(Continued)

(58) Field of Classification Search
CPC ......... F01L 1/181; F01L 1/46; F01L 13/0036; F01L 2105/00
(Continued)

(56) References Cited

U.S. PATENT DOCUMENTS 5,435,276 A * 7/1995 Nakamura .......... F01L 13/0036
123/90.16
2012/0325168 A1* 12/2012 Nitz ....................... F01L 1/185
123/90.17
(Continued)

FOREIGN PATENT DOCUMENTS

AT    511050 A1    8/2012
DE    3346556 A1    7/1984
(Continued)

OTHER PUBLICATIONS

European search report of corresponding application EP 18165461. 7., dated Aug. 16, 2018.
(Continued)

*Primary Examiner* — Jorge L Leon, Jr.
(74) *Attorney, Agent, or Firm* — Maginot, Moore & Beck LLP

(57) ABSTRACT

A variable valve gear for a combustion engine includes at least one lift valve and a camshaft, which comprises a first cam and a second cam (20) arranged offset in a longitudinal direction of the camshaft. The variable valve gear further comprises a transmission lever, which is arranged in operative connection between at least the one lift valve and the camshaft for actuating at least the one lift valve. The transmission lever comprises a swivel axis, a mounting and a cam follower (28). The mounting is supported so that it can swivel about the swivel axis. The mounting holds the cam follower (28). The mounting is supported so that it is axially displaceable parallel to the swivel axis and/or parallel to the camshaft, so that the cam follower (28) follows either the cam contour of the first cam or the cam contour of the second cam (20).

17 Claims, 5 Drawing Sheets

(51) Int. Cl.
*F01L 1/047* (2006.01)
*F01L 13/08* (2006.01)

(52) U.S. Cl.
CPC .............. *F01L 1/185* (2013.01); *F01L 13/08* (2013.01); *F01L 2001/186* (2013.01); *F01L 2013/001* (2013.01); *F01L 2013/10* (2013.01); *F01L 2013/101* (2013.01); *F01L 2105/00* (2013.01); *Y02T 10/142* (2013.01)

(58) Field of Classification Search
USPC ..................... 123/90.15, 90.21, 90.39, 90.44
See application file for complete search history.

(56) References Cited

U.S. PATENT DOCUMENTS

| | | | | |
|---|---|---|---|---|
| 2017/0241305 A1* | 8/2017 | Xi | ............................ | F01L 13/06 |
| 2018/0216505 A1* | 8/2018 | Altherr | ..................... | F01L 1/18 |
| 2018/0283226 A1* | 10/2018 | Altherr | ................... | F01L 1/053 |
| 2018/0283237 A1* | 10/2018 | Altherr | ................... | F01L 1/053 |
| 2018/0283240 A1* | 10/2018 | Rommel | ................... | F01L 1/18 |

FOREIGN PATENT DOCUMENTS

| | | |
|---|---|---|
| DE | 3315396 A1 | 10/1984 |
| DE | 102014212305 A1 | 1/2015 |
| DE | 102014210734 A1 | 12/2015 |
| DE | 202015009047 U1 | 8/2016 |
| JP | S61129411 A | 6/1986 |
| JP | S61185606 A | 8/1986 |
| JP | S61155605 U | 9/1986 |
| JP | 2005155555 A | 6/2005 |
| WO | 2015185046 A1 | 12/2015 |
| WO | 2016059456 A1 | 4/2016 |

OTHER PUBLICATIONS

German search report of corresponding application DE 102017003439., dated Nov. 16, 2017.

* cited by examiner

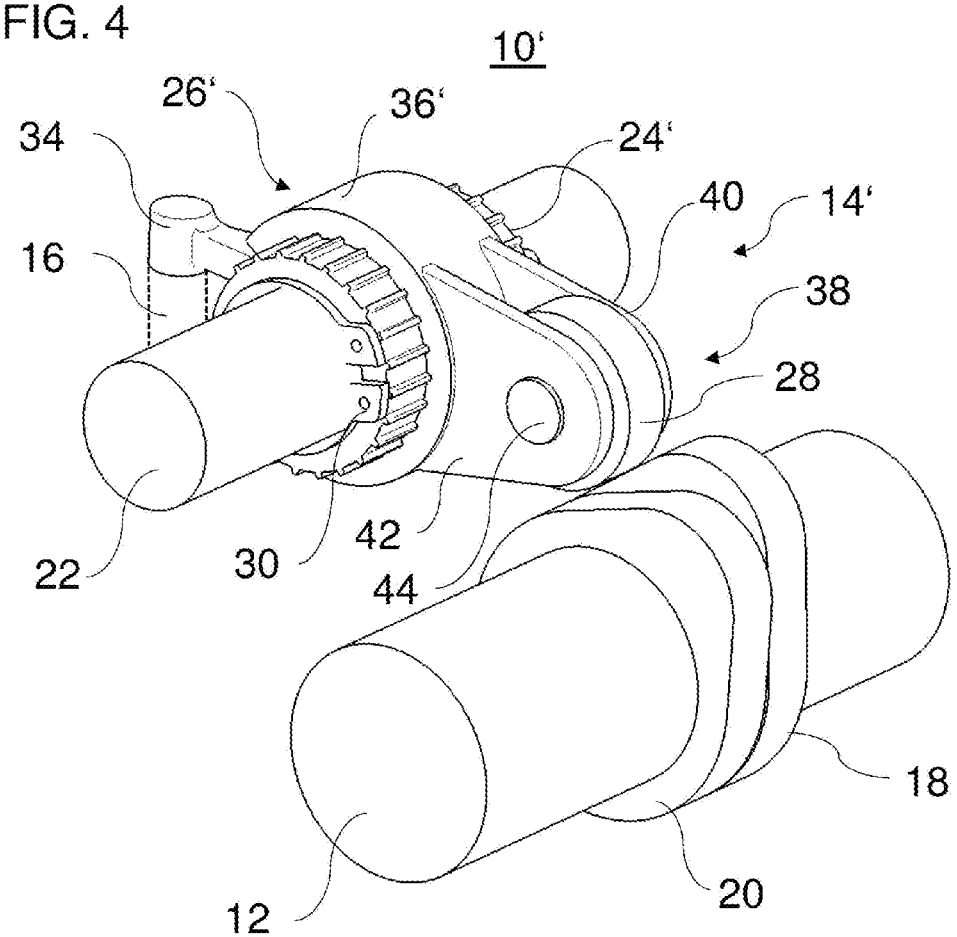

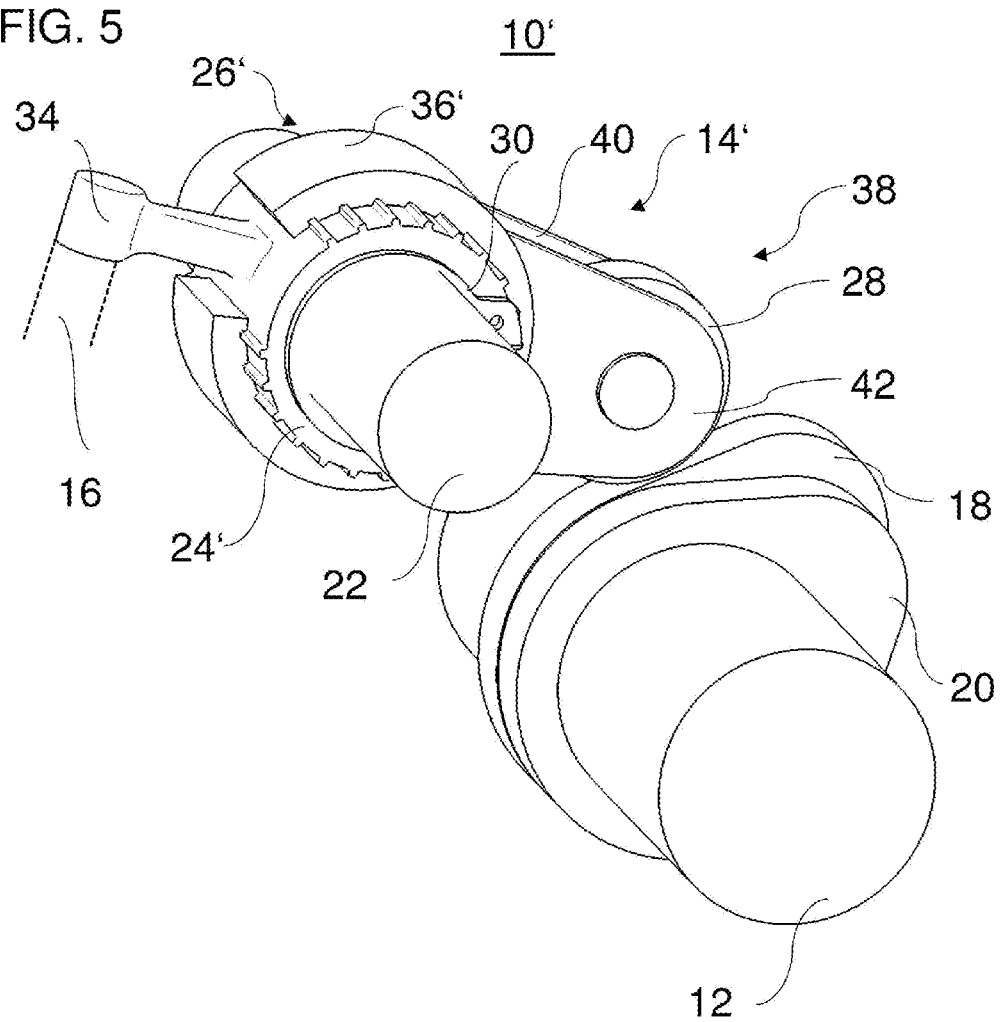

VARIABLE VALVE GEAR

CROSS-REFERENCE TO RELATED APPLICATIONS

This application claims priority from German Patent Application No. 10 2017 003 439.7, which was filed on Apr. 8, 2017, and is incorporated herein by reference in its entirety.

DESCRIPTION

The invention relates to a variable valve gear for a combustion engine and to a motor vehicle having a variable valve gear.

Variable valve gears can be used to vary the valve timings of charge cycle valves of a combustion engine. Variable valve gears are additionally or alternatively capable of adjusting the valve lifts of the charge cycle valves.

One known variable valve gear is the so-called Audi Valvelift System (AVS). In this system a cam carrier is arranged so that it is axially displaceable on a camshaft. The cam carrier comprises a first cam and a second cam arranged offset in the longitudinal direction of the camshaft. The first cam and the second cam differ from one another in their contour, for example, and/or are arranged circumferentially offset in relation to one another. An actuator device serves to displace the cam carrier between a first axial position and a second axial position. In the first axial position of the cam carrier a charge cycle valve is operatively connected to the first cam via a transmission lever. In the second axial position of the cam carrier the charge cycle valve is operatively connected to the second cam via the transmission lever.

The known system can have the disadvantage that a relatively large mass has to be moved in the form of the cam carrier with the double cam. The relatively large mass can have a negative effect on the speed that can be achieved in switching sequences between the cams.

The object of the invention, therefore, is to provide an improved variable valve gear which in particular overcomes the disadvantages inherent in the prior art.

The object is achieved by a variable valve gear for a combustion engine according to the independent claim. Advantageous developments are specified in the dependent claims and in the description.

The variable valve gear comprises at least one lift valve, in particular a charge cycle valve, and a camshaft. The camshaft comprises a first cam and a second cam arranged offset in a longitudinal direction of the camshaft. A cam contour of the first cam differs from a cam contour of the second cam and/or the first cam and the second cam are arranged offset in a circumferential direction about a longitudinal axis of the camshaft. The variable valve gear further comprises a transmission lever, which is arranged in operative connection between at least the one lift valve and the camshaft for actuating at least the one lift valve. The transmission lever comprises a swivel axis, a mounting and a cam follower. The mounting is supported so that it can swivel about the swivel axis. The mounting holds the cam follower. The mounting is supported so that it is axially displaceable parallel to the swivel axis and/or parallel to the camshaft, so that the cam follower follows either the cam contour of the first cam or the cam contour of the second cam.

Since the mounting holds only the cam follower it can be of compact construction and can therefore have a smaller mass. This affords the facility, in particular, for rapid switching sequences between the first cam and the second cam.

The first cam and the second cam may be formed so that they produce different operating cycles (valve timings and/ or lifts) of the connected lift valve.

The mounting may be displaceable between a first axial position, in which an operative connection exists between the charge cycle valve and the first cam, and a second axial position, in which an operative connection exists between the charge cycle valve and the second cam.

In particular, the first axial position and the second axial position may be defined (fixed) by a corresponding first stop and a corresponding second stop for the mounting.

The combustion engine may be used, for example, in a motor vehicle, in particular a commercial vehicle such as a lorry, a bus, a construction machine or an agricultural machine. The combustion engine may also be used in a rail vehicle, as a marine engine or as a fixed motor for generating power, for example.

In a preferred embodiment the mounting is supported directly on the swivel axis so that it is capable of swiveling and axially displaceable. The direct support on the swivel axis affords a particularly simple construction.

Alternatively, the transmission lever may further comprise a carrier component, which is supported so that it can swivel about the swivel axis and supports the mounting so that it is axially displaceable. The insertion of a carrier component affords an especially compact design of the mounting.

In one exemplary embodiment the carrier component or the mounting (particularly in the absence of a carrier component) comprises an axial bore for the swivel axis. The connection between the axial bore and the swivel axis affords the carrier component or the mounting an especially simple rotatable support on the swivel axis.

In a further exemplary embodiment the carrier component is torsionally fixed to the mounting about the swivel axis. The connection may, in particular, comprise a positive interlock between the mounting and the carrier component. This has the advantage that it does not require additional means for the torsionally fixed connection of the carrier component and the mounting.

The carrier component in a cross sectional plane perpendicular to a longitudinal direction of the swivel axis advantageously has an external contour that is rotationally asymmetrical (non rotationally symmetrical) around the swivel axis. Alternatively or in addition, the mounting in a cross sectional plane perpendicular to a longitudinal direction of the swivel axis has an internal contour that is rotationally asymmetrical (non rotationally symmetrical) around the swivel axis. This affords a torsionally fixed connection between the carrier component and the mounting without the provision of additional means.

In a design variant the external contour and/or the internal contour comprises a profiling, preferably a splined profile or toothed profile. Alternatively or in addition, the external contour and/or the internal contour in particular has a polygonal shape, for example a rectangular shape. Such contours are easy to produce and reliable in use.

The mounting may possibly enclose the carrier component only partially. In other words, an internal contour of the mounting does not necessarily have to be closed for the connection to an external contour of the carrier component.

In a further design variant the carrier component is axially secured on the swivel axis, for example by a retaining ring secured on the swivel axis, or a fitted key. This prevents the carrier component shifting on the swivel axis.

In one embodiment the mounting and/or the carrier component comprises an actuation portion for actuating at least the one lift valve.

The actuation portion may be arranged on an opposite side of the swivel axis to the cam follower or on the same side of the swivel axis as the cam follower.

In a further embodiment the mounting comprises a fork area having two opposite projections. In particular, an axis of rotation, on which the cam follower is rotatably supported, extends between the projections. The fork area affords an especially compact support of the cam follower.

The cam follower may advantageously be embodied as a roller, which is, in particular, rotatably supported by the mounting. This has the advantage that the friction in the valve gear can be reduced.

In one exemplary embodiment the variable valve gear further comprises an actuator device, which is designed to displace the mounting axially, parallel to the swivel axis and/or to the camshaft. The actuator device may displace the mounting between the first axial position and the second axial position.

In a further exemplary embodiment the actuator device is embodied as a pneumatic, hydraulic, electromechanical and/or electromagnetic actuator device.

In one embodiment the actuator device is directly or indirectly connected, for example via a linkage, to the mounting.

In a further embodiment the actuator device is at least partially integrated in the transmission lever or arranged outside the transmission lever. An external arrangement may facilitate assembly and maintenance. Integration may afford a more compact construction.

In a design variant the actuator device displaces the mounting by impinging on a lateral face of the mounting, which extends perpendicular to a longitudinal direction of the swivel axis. In particular, the actuator device impinges on a projection (or both projections) of a fork area of the mounting. Such an arrangement may be particularly favourable in its overall dimensions, since the actuator can be arranged in a free area next to the transmission lever, without increasing the overall dimensions of the variable valve gear. This may be advantageous particularly in a system with twin overhead camshafts.

In a further design variant the actuator device is designed and/or controlled so that the cam follower is displaced only between a base circle of the first cam and a base circle of the second cam.

In one exemplary embodiment the camshaft comprises at least one further cam, which is arranged offset in a longitudinal direction of the camshaft relative to the first cam and the second cam. A cam contour of each further cam differs from a cam contour of the first cam and a cam contour of the second cam; alternatively or in addition, each further cam is arranged offset in a circumferential direction about a longitudinal axis of the camshaft relative to the first cam and the second cam. A displacement of the mounting also alternatively causes the cam follower to follow the cam contour of each further cam. This has the advantage of affording greater flexibility in terms of different valve timings and/or valve lifts.

The transmission lever is advantageously embodied as a finger follower arm or a rocker arm. The transmission lever can therefore be integrated into various valve gear systems, for example with overhead camshaft or with bottom-mounted camshaft.

In one embodiment at least the one lift valve is an inlet valve of the combustion engine and the first cam produces a normal operation and/or the second cam produces a Miller cycle, an Atkinson cycle, a heat management cycle, a decompression cycle or a cylinder shutoff. The normal operation corresponds to an opening of the inlet valve according to a Diesel or Otto cycle process, in which the inlet valve is opened during the intake stroke. In the Miller cycle the inlet valve is closed earlier relative to the former, thereby reducing the quantity of charge air. In the Atkinson cycle the inlet valve is closed later than in the normal operation. This also reduces the quantity of charge air.

In a further embodiment at least the one lift valve is an exhaust valve of the combustion engine and the first cam produces a normal operation and/or the second cam produces an engine braking cycle, a heat management cycle, a decompression cycle or a cylinder shutoff. The normal operation corresponds to an opening of the exhaust valve according to a Diesel or Otto cycle process, in which the exhaust valve is opened during the exhaust stroke. In the engine braking cycle the exhaust valve may be opened at the end of the compression stroke and/or opened at the end of the exhaust stroke.

In the heat management cycle the heat balance of the combustion engine is purposely influenced compared to the normal operation, in order to increase the exhaust gas temperature, for example. In the decompression cycle the lift valve is kept open. In the case of cylinder shutoff the lift valve is not actuated. The second cam may be a zero cam.

The invention further relates to a motor vehicle, in particular a commercial vehicle, having a variable valve gear as disclosed herein.

The preferred embodiments and features of the invention hitherto described lend themselves to any combination with one another. Further details and advantages of the invention are described below, referring to the drawings attached, in which:

FIG. 4 shows a perspective view of a variable valve gear according to a second embodiment; and FIG. 5 shows a further perspective view of the variable valve gear according to the second embodiment.

Figure 1:
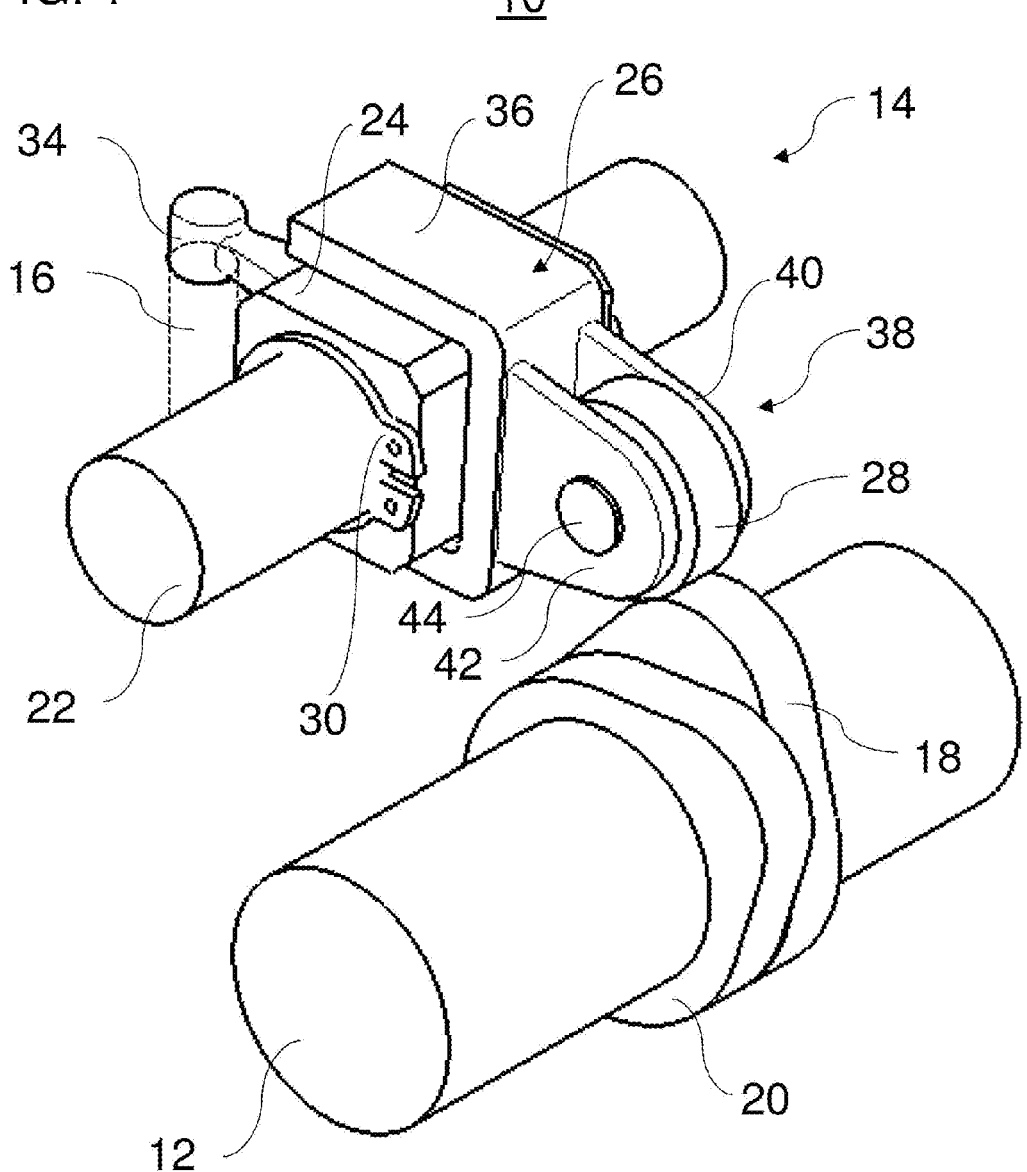
FIG. 1 shows a perspective view of a variable valve gear according to a first embodiment.

The embodiments shown in the figures correspond at least partially to one another, so that similar or identical parts are provided with the same reference numerals, and for an explanation of these reference is also made to the description of the other embodiments and figures, in order to avoid repetition.

Figure 2:
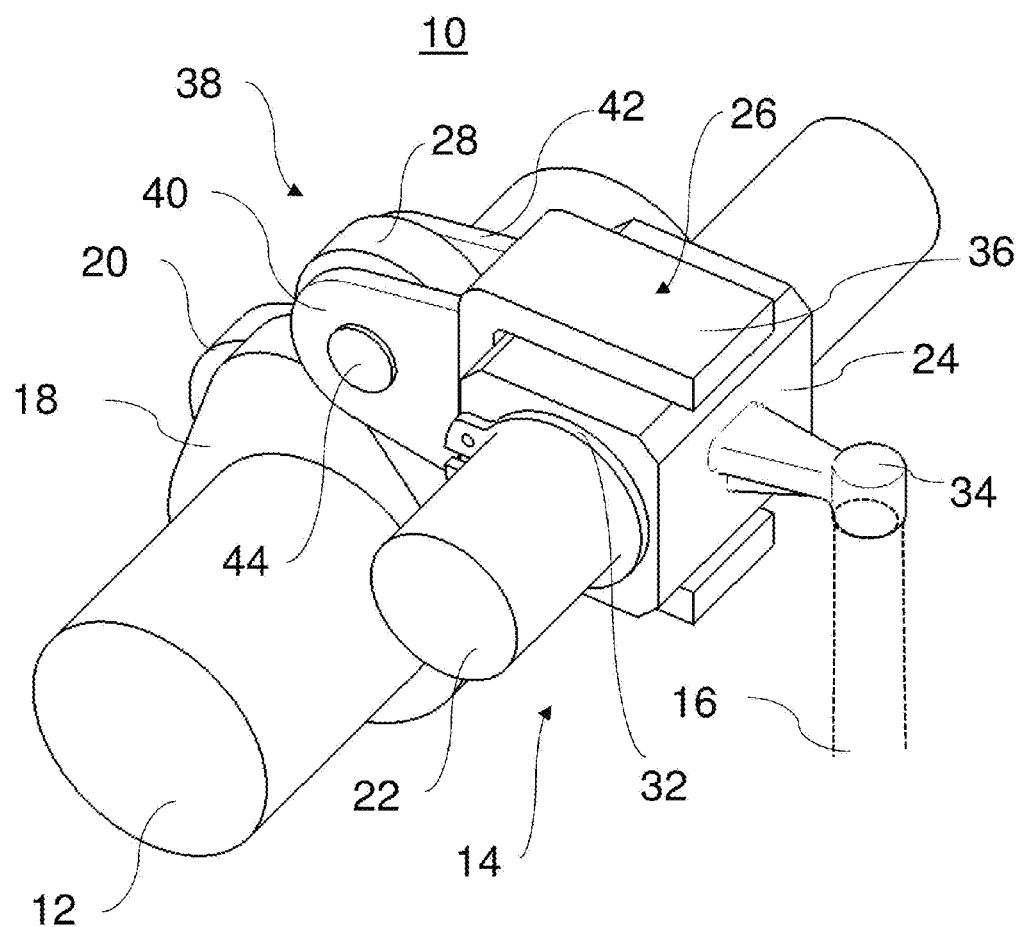
FIG. 2 shows a further perspective view of the variable valve gear according to the first embodiment.

FIGS. 1 and 2 show different views of a variable valve gear 10. The variable valve gear 10 comprises a camshaft 12, a transmission lever 14 and a lift valve 16 (indicated only in part by dashed lines in FIGS. 1 and 2). The lift valve is, in particular, a charge cycle valve, for example an inlet valve or an exhaust valve, of a cylinder of a combustion engine.

The camshaft 12 may take the form of an overhead or a bottom-mounted camshaft. The camshaft 12 comprises a first cam 18 and a second cam 20. The first cam 18 is arranged next to the second cam 20 in a longitudinal direction of the camshaft 12. The first cam 18 adjoins the second cam 20. In other embodiments the cams 18 and 20 may be spaced at a distance from one another in a longitudinal direction of the camshaft 12.

The cams 18 and 20 are designed to actuate the lift valve 16 in different ways. The cams 18, 20 are arranged offset in a circumferential direction about a longitudinal axis of the camshaft 12. In addition or alternatively, the cams 18, 20 might have different cam contours, for example elevations of different height and/or width.

The transmission lever 14 is arranged in operative connection between the camshaft 12 and the lift valve 16. In detail, the transmission lever 14 is capable of producing an operative connection either between the first cam 18 and the lift valve 16 or between the second cam 20 and the lift valve 16. In some embodiments the transmission lever 14 may be operatively connected to a plurality of lift valves.

The transmission lever 14 comprises a swivel axis 22, a carrier component 24, a mounting 26 and a cam follower 28.

The carrier component 24 is arranged so that it can swivel on the swivel axis 22. The swivel axis 22 may be fixed, for example, in a cylinder head. In detail, the carrier component 24 comprises an axial bore for the swivel axis 22. The carrier component 24 is capable of swiveling about a longitudinal axis of the swivel axis 22. The carrier component 24 is axially fixed on the swivel axis 22, for example by the retaining rings 30, 32 shown. In one embodiment one of the retaining rings may also serve as a stop for the displaceable mounting 26.

The carrier component 24 comprises an actuation portion 34, which is in direct or indirect operative connection with the portion of the charge cycle valve 16. Alternatively, the mounting 26 could comprise the actuation portion 34.

It is also possible for the actuation portion to be operatively connected to a plurality of charge cycle valves, for example via a bridge.

In the embodiment shown the carrier component 24 has a rectangular basic shape with chamfered edges. In particular, the carrier component 24 has a rectangular external contour with chamfered corners in a plane perpendicular to the longitudinal axis of the swivel axis 22.

The mounting 26 comprises a guide area 36 and a fork area 38. The fork area 38 is fixed, for example welded, to the guide area 36. The guide area 36 has a U-shaped cross section in a plane perpendicular to the longitudinal direction of the swivel axis 22. The guide area 36 partially encloses the carrier component 24. The guide area 36 and the carrier component 24 are adapted so that the guide area 36 is displaceable on the carrier component 24. The guide area 36 is displaceable on the carrier component 24 in a direction parallel to the swivel axis 22 and to the camshaft 12.

In other embodiments the mounting for the cam follower may be directly fitted on the swivel axis 22, for example. In other words, the carrier component may be dispensed with. The mounting is then connected so that it is axially displaceable with the swivel axis 22. The mounting is moreover rotatably connected to the swivel axis 22. The mounting comprises a circular axial bore for the swivel axis 22, for example.

The mounting 26 holds the cam follower 28. In detail, the mounting 26 comprises the fork area 38. The fork area 38 comprises two opposing projections or flanks 40, 42. The projections 40, 42 extend from the guide area 36. An axis of rotation 44 extends between the projections 40, 42. The cam follower 28 is arranged on the axis of rotation 44. In the present embodiment the cam follower 28 takes the form of a roller. The cam follower 28 may also take some other form, however.

The cam follower 28 is designed to follow a cam contour of a cam during a rotation of the camshaft 12. In so doing the cam contour causes the transmission lever 14 to swivel about the swivel axis 22 in order to actuate the lift valve 16.

The cam follower 28 and the actuation portion 34 are arranged on opposite sides of the swivel axis 22. In other words, the transmission lever 14 is embodied as a rocker arm. In other embodiments the cam follower 28 and the actuation portion 34 may be arranged on the same side of the swivel axis 22. That is to say the transmission lever may also take the form of a finger follower arm, for example.

The cam follower 28 may follow either a cam contour of the first cam 18 (as represented in FIGS. 1 and 2) or a cam contour of the second cam 20. For this purpose the mounting 26 can be displaced between a first axial position and a second axial position. In the first axial position the mounting 26 holds the cam follower 28 so that the cam follower 28 follows the cam contour of the first cam 18. In the second axial position the cam follower 28 follows the cam contour of the second cam 20. The first and second axial position may be defined by stops for the mounting 26, for example.

This allows different cam contours to be used for actuating the lift valve 16. Thus different valve timings can be achieved for one or more lift valves 16, for example as a function of the load. It is feasible, for example, to switch between normal valve timings and Miller valve timings for one or more inlet valves. The normal valve timings correspond, for example, to the valve timings for an Otto or Diesel cycle process. An exhaust valve may be switched, for example, between a normal operation with the exhaust valve opening during the exhaust stoke and an engine-braking cycle. In the engine-braking cycle, for example, no fuel is injected and the exhaust valve is opened, for example, at the end of the compression stroke and/or at the end of the exhaust stroke, so that negative work is performed by the corresponding cylinder, which brakes the crankshaft.

In some embodiments the mounting 26 may additionally be displaced, so that the cam follower 28 follows a cam contour of a further cam of the camshaft 12. For this purpose the camshaft 12 may comprise at least one further cam. At least the one further cam is arranged offset in a longitudinal direction of the camshaft 12 relative to the first cam 18 and the second cam 20. A cam contour of each further cam differs from a cam contour of the second cam 20 and a cam contour of the first cam 18. Alternatively, the cams may be arranged offset in a circumferential direction about a longitudinal axis of the camshaft 12. The cams may directly adjoin one another, for example.

An actuator device is provided for displacing the mounting 26. The actuator device is designed to displace the mounting 26 axially, parallel to the swivel axis 22 and to the camshaft 12. In detail, the actuator device is designed to displace the mounting 26 at least between the first axial position and the second axial position. In the first axial position (shown in FIGS. 1 and 2) the cam follower 28 is in contact with the cam contour of the first cam 18. In the second axial position the cam follower 28 is in contact with the cam contour of the second cam 20.

The actuator device may be embodied as a pneumatic, hydraulic, electromechanical and/or electromagnetic actuator device, for example. In the case of a hydraulic actuator device an operating cylinder, a system with springs and/or two chambers that can be filled with hydraulic fluid etc. may be used, for example.

In some embodiments the actuator device may displace the mounting 26 axially in only one direction, the latter feasibly being returned by elastic elements, for example a spring. Alternatively, the actuator device may displace the mounting 26 axially in a first direction and a second, opposing direction.

The actuator device may be directly or indirectly connected, for example via a linkage, to the mounting 26. In some embodiments the actuator device may be at least partially integrated in the transmission lever 14 or arranged outside the transmission lever 14. The actuator device may, in particular, be designed or controlled so that the mounting 26 and therefore the cam follower 28 is displaced only between a base circle of the first cam 18 and a base circle of the second cam 20.

Figure 3:
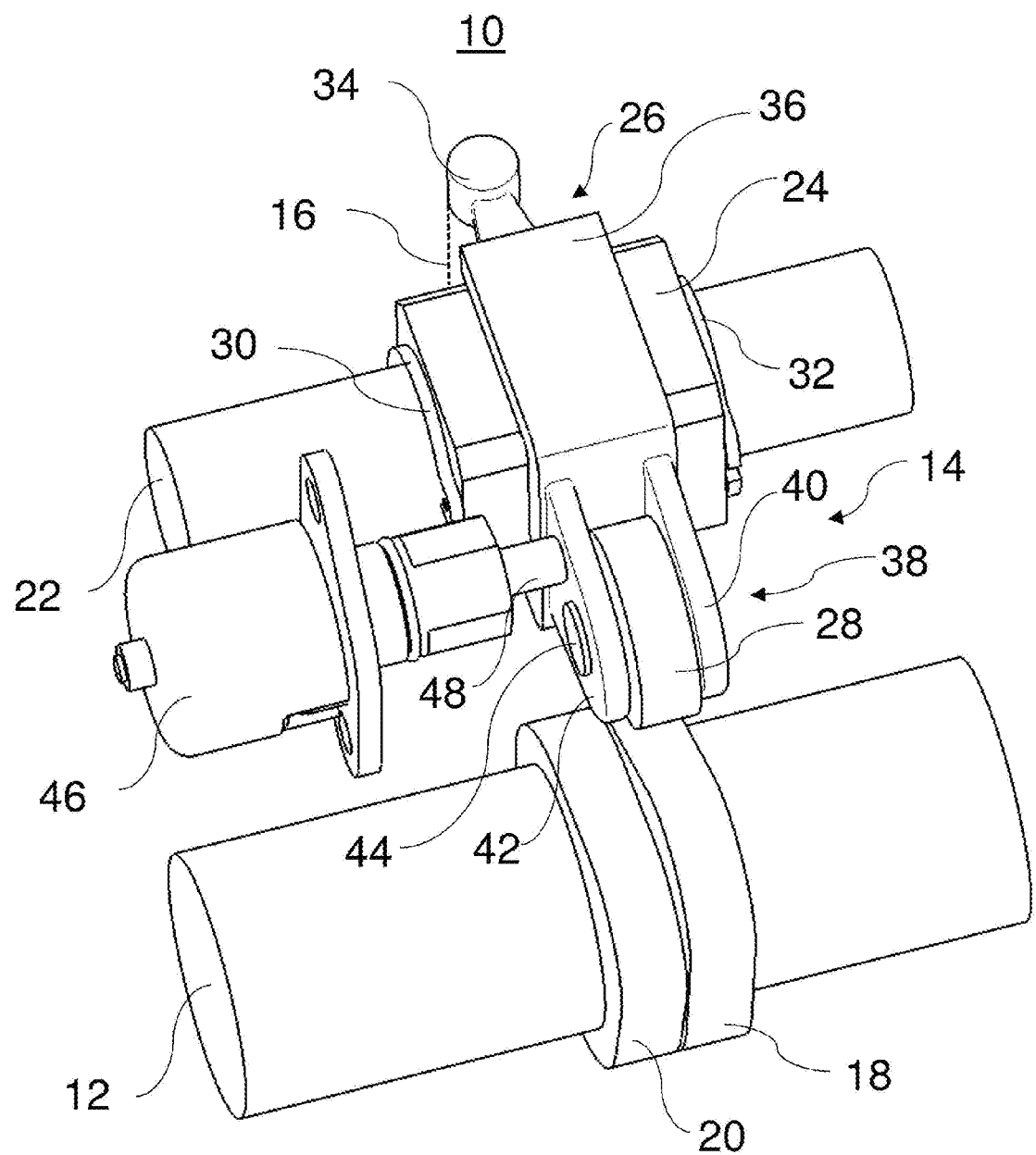
FIG. 3 shows a further perspective view of the variable valve gear according to the first embodiment with actuator device.

FIG. 3 represents an example of an actuator device 46. The actuator device 46 is immovably fixed to a suitable component (not shown). The actuator device 46 comprises a movable pin 48, which impinges upon a face of the projection 42. As is shown in FIG. 3, extending of the pin 48 causes a displacement of the mounting 26, so that the cam follower 28 follows the cam contour of the first cam 18. In other words, extending of the pin 28 causes the mounting 26 to be displaced into the first axial position. In order for the cam follower 28 to follow a cam contour of the second cam 20, some method of return is necessary. The return may be performed, for example, by a further actuator (not shown) of the actuator device 46. The further actuator may impinge on an opposite side of the fork area 38, for example. Return by means of elastic elements (not shown) is equally possible.

FIGS. 4 and 5 show a further embodiment of the variable valve gear. The variable valve gear 10' in FIGS. 4 and 5 is of similar design to the variable valve gear 10 in FIGS. 1 and 2. In contrast to the variable valve gear 10 in FIGS. 1 and 2 the variable valve gear 10' in particular comprises a modified carrier component 24' and a modified mounting 26'.

The carrier component 24' comprises an external profiling in the form of a toothing. The external profiling of the carrier component 24' engages with a corresponding internal profiling of the guide 36' of the mounting 26'. The guide 36' of the mounting 26' partially encloses the carrier component 24'. The guide 36' has a curved, segmental cross section in a cross sectional plane perpendicular to the swivel axis 22. The intermeshing profilings of the carrier component 24' and the mounting 26' allow an axial displacement of the mounting 26' on the carrier component 24'. The intermeshing profilings moreover torsionally fix the mounting 26' to the carrier component 24' about the swivel axis 22.

In general, the carrier component may have a rotationally asymmetrical external contour around the swivel axis 22 in a cross sectional plane perpendicular to a longitudinal direction the swivel axis 22. The mounting may have a corresponding rotationally asymmetrical internal contour. This allows an axial displacement of the mounting relative to the carrier component and at the same time torsionally fixes the mounting to the carrier component.

The invention is not limited to the preferred exemplary embodiments described above. Rather a number of variants and modifications are possible, which likewise make use of the idea of the invention and therefore lie within the scope of the patent. In particular, the invention also claims protection for the subject matter and the features of the dependent claims, independently of the claims referred to.

LIST OF REFERENCE NUMERALS 10 variable valve gear
12 camshaft
14 transmission lever (rocker arm)
16 lift valve (charge cycle valve)
18 first cam
20 second cam
22 swivel axis
24 carrier component
26 mounting
28 cam follower (roller)
30 first retaining ring
32 second retaining ring
34 actuation portion
36 guide area
38 fork area
40 first projection
42 second projection
44 axis of rotation
46 actuator device
48 pin

The invention claimed is:

1. A variable valve gear for a combustion engine, the variable valve gear comprising:
   at least one lift valve;
   a camshaft, which comprises a first cam and a second cam arranged offset along a longitudinal axis of the camshaft, wherein a cam contour of the first cam differs from a cam contour of the second cam and/or the first cam and the second cam are arranged offset in a circumferential direction about the longitudinal axis of the camshaft; and
   a transmission lever, which is arranged in operative connection between the at least one lift valve and the camshaft so as to actuate the at least one lift valve, wherein:
   the transmission lever comprises a swivel axis, a mounting and a cam follower;
   the mounting is operably supported so as to swivel about the swivel axis;
   the mounting holds the cam follower; and
   the mounting is operably supported to be axially displaced parallel to the swivel axis and/or parallel to the camshaft, such that the cam follower follows either the cam contour of the first cam or the cam contour of the second cam; and wherein,
   the transmission lever further comprises a carrier component, which is operably supported so as to swivel about the swivel axis and supports the mounting such that the mounting is configured to be displaced axially with respect to the carrier component, and
   the mounting encloses the carrier component partially.

2. The variable valve gear according to claim 1, wherein:
   the carrier component or the mounting comprises an axial bore for the swivel axis;
   and/or the carrier component is torsionally fixed to the mounting about the swivel axis.

3. The variable valve gear according to claim 1, wherein:
   the carrier component in a cross sectional plane perpendicular to the swivel axis has an external contour that is rotationally asymmetrical around the swivel axis;
   and/or the mounting in a cross sectional plane perpendicular to the swivel axis has an internal contour that is rotationally asymmetrical around the swivel axis.

4. The variable valve gear according to claim 3, wherein:
   the external contour and/or the internal contour comprises a profiling;
   and/or the external contour and/or the internal contour has a polygonal shape.

5. The variable valve gear according to claim 3, wherein:
   the external contour and/or the internal contour comprises a splined profile or a toothed profile.

6. The variable valve gear according to claim 3, wherein: the external contour and/or the internal contour has a polygonal shape.

7. The variable valve gear according to claim 1, wherein the carrier component is axially secured on the swivel axis.

8. The variable valve gear according to claim 1, wherein the mounting and/or the carrier component comprises an actuation portion for actuating the at least one lift valve.

9. The variable valve gear according to claim 1, wherein:
the mounting comprises a fork area with two opposite projections.

10. The variable valve gear according to claim 1, further comprising an actuator device, which is configured to displace the mounting axially, parallel to at least one of the swivel axis and to the camshaft.

11. The variable valve gear according to claim 10, wherein:
the actuator device is embodied as a pneumatic, hydraulic, electromechanical and/or electromagnetic actuator device and/or the actuator device is connected to the mounting;
and/or the actuator device is at least partially integrated in the transmission lever or arranged outside the transmission lever.

12. The variable valve gear according to claim 10, wherein:
the actuator device displaces the mounting by impinging on a lateral face of the mounting, which extends perpendicular to the swivel axis;
and/or the actuator device is configured and/or controlled so that the cam follower is displaced only between a base circle of the first cam and a base circle of the second cam.

13. The variable valve gear according to claim 1, wherein:
the camshaft further comprises a third cam, which is arranged offset in the longitudinal direction of the camshaft relative to the first cam and the second cam, wherein a cam contour of the third cam differs from the cam contour of the first cam and the cam contour of the second cam and/or the third cam is arranged offset in the circumferential direction about the longitudinal axis of the camshaft relative to the first cam and the second cam; and
a displacement of the mounting causes the cam follower to follow the cam contour of the third cam.

14. The variable valve gear according to claim 1, wherein the transmission lever is embodied as a finger follower arm or a rocker arm.

15. The variable valve gear according to claim 1, wherein:
the at least one lift valve is an inlet valve of the combustion engine and the first cam produces a normal operation and/or the second cam produces a Miller cycle, an Atkinson cycle, a heat management cycle, a decompression cycle or a cylinder shutoff;
or the at least one lift valve is an exhaust valve of the combustion engine and the first cam produces a normal operation and/or the second cam produces an engine braking cycle, a heat management cycle, a decompression cycle or a cylinder shutoff.

16. The variable valve gear according to claim 1, wherein:
the carrier component is torsionally fixed to the mounting about the swivel axis via a positive interlock between the mounting and the carrier component.

17. A motor vehicle, comprising:
a variable valve gear, the variable valve gear comprising:
at least one lift valve;
a camshaft, which comprises a first cam and a second cam arranged offset along a longitudinal axis of the camshaft, wherein a cam contour of the first cam differs from a cam contour of the second cam and/or the first cam and the second cam are arranged offset in a circumferential direction about the longitudinal axis of the camshaft; and
a transmission lever, which is arranged in operative connection between the at least one lift valve and the camshaft so as to actuate the at least one lift valve, wherein:
the transmission lever comprises a swivel axis, a mounting and a cam follower;
the mounting is operably supported so as to swivel about the swivel axis;
the mounting holds the cam follower; and
the mounting is operably supported so as to be axially displaced parallel to the swivel axis and/or parallel to the camshaft, such that the cam follower follows either the cam contour of the first cam or the cam contour of the second cam; and
wherein,
the transmission lever further comprises a carrier component, which is operably supported so as to swivel about the swivel axis and supports the mounting such that it can be displaced axially with respect to the carrier component, and
the mounting encloses the carrier partially.

* * * * *